May 3, 1960  H. GEHRE  2,934,952
ORIFICE PLATE THROTTLING DEVICE FOR AXIAL
FLOW MEASURING WHEEL METERS
Filed June 1, 1953  2 Sheets-Sheet 1

INVENTOR.
HANS GEHRE
BY
  Burgess Dinklage Sprung
  ATTORNEYS

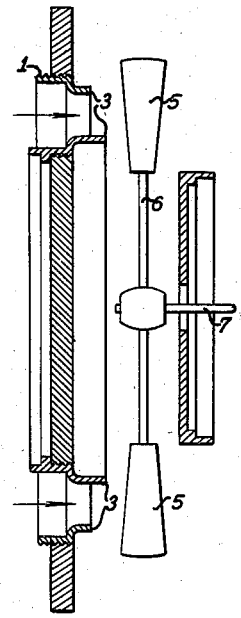
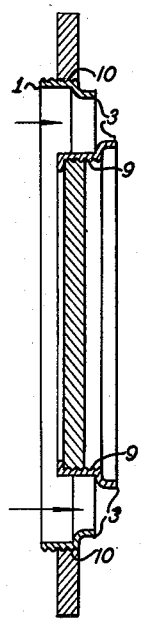
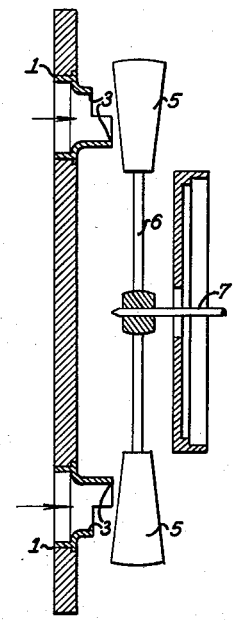
Fig.4a  Fig.4b  Fig.5a
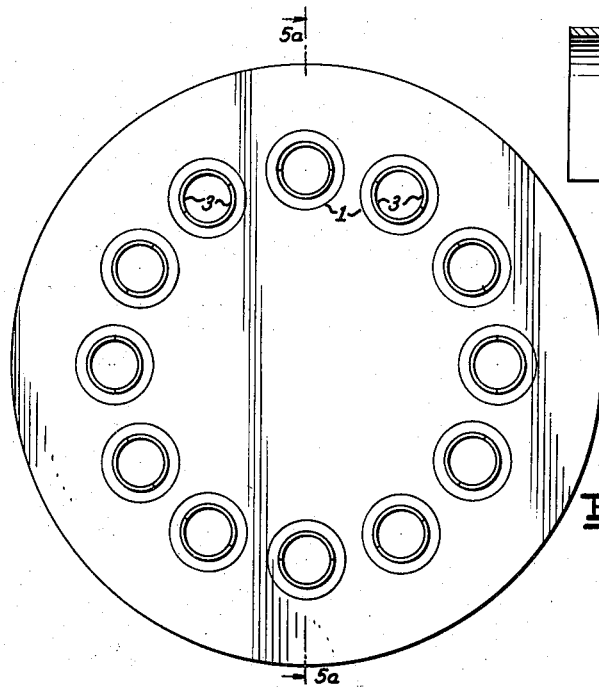
Fig.5
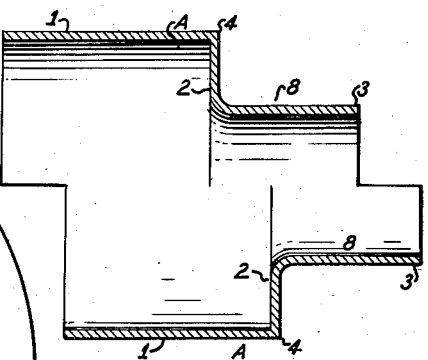
Fig.6
INVENTOR.
HANS GEHRE United States Patent Office 2,934,952
Patented May 3, 1960

2,934,952
ORIFICE PLATE THROTTLING DEVICE FOR AXIAL FLOW MEASURING WHEEL METERS

Hans Gehre, Oberkassel, Siegkreis, Germany

Application June 1, 1953, Serial No. 358,653

Claims priority, application Germany June 7, 1952

14 Claims. (Cl. 73—231)

The present invention relates to an improvement in measuring wheel meters such as Woltman meters and other axial flow type of meters, as, for example, paddle wheel, fan wheel, turbine meters, etc. (hereinafter referred to, for convenience, as Woltman meters) and more particularly to the construction of the parts forming the throttle cross-section usually preceding the measuring wheel of such meters.

Outflow orifices serving as throttle devices are already known for the flow measurement of liquids and gases and have also been used for the purpose mentioned in Woltman meters, in which the throttle cross-section is formed from two or more openings or orifices combined in parallel having contrasting outflow characteristics in the lower range of Reynolds numbers, such as nozzles and diaphragms, whereby a considerable improvement of the measuring error curve (extension of the lower measuring range limits) is achieved by the compensation of the outflow co-efficients.

The adjustment of such throttle devices, particularly if gaseous media are to be measured, requires a high degree of understanding and sensitivity for flow processes and, moreover, a considerable consumption of time.

By the present invention, it is possible to give the throttle cross-section before the measuring wheel of Woltman meters a construction which influences the error curve of the meter in the same favourable manner as said combined orifices but offers a most simple and most rapid adjustability.

The invention consists essentially in that, in using a known throttle opening or orifice with a cylindrical outflow extension, the outflow edges of this extension at one part of the opening are staggered with respect to that of the other part in the axial direction. The throttle openings or nozzles may in the conventional manner be defined as an annular opening or by a ring of individual circular openings with the two embodiments being completely equivalent.

The construction can be effected in accordance with the invention, for example, by the length of the cylindrical extension being greater at one part of the nozzle than at the other or by the nozzle consisting of parts with equal-length cylindrical outflow extensions, which are staggered with respect to each other in the axial direction. In Woltman meters, the throttle cross-section is well known to be generally formed by a ring of individual circular openings or by a continuous or sub-divided anular opening. In both cases, the arrangement according to the invention is preferably so disposed that the outer part lying at the greater radius from the paddle-wheel axis carries the outflow edge lying to the rear in the direction of flow.

The invention and the considerations fundamental to it are explained below with reference to the drawings in which:

Fig. 4a is a vertical section of Fig. 4 additionally showing the meter wheel.

Fig. 4b is a vertical section of an embodiment similar to that of Fig. 4 in which the nozzle cross-section is defined by two opposed portions axially staggered with respect to each other.

Fig. 5 is a plan view of an embodiment in accordance with the invention viewed from the rear having the nozzle openings collectively defined by a ring of individual circular nozzles.

Fig. 5a is a vertical section of an embodiment shown in Fig. 5 additionally showing the meter wheel.

Fig. 6 is a diagrammatic vertical section of a further embodiment of a nozzle construction in accordance with the invention having two substantially similar opposed nozzle parts axially staggered in respect to each other.

If the throttle cross-section is indicated by F, the rate of flow, i.e., the volume of fluid flowing through the meter in one second or in any other time unit by Q and the outflow co-efficient by $\alpha$, then the velocity of flow at the throttle device is $$V = \frac{Q}{F \cdot \alpha}$$

At a given cross-section F and for the case where $\alpha$ is constant over the whole measuring range, it must be a linear function of Q for this range.

Figure 1:
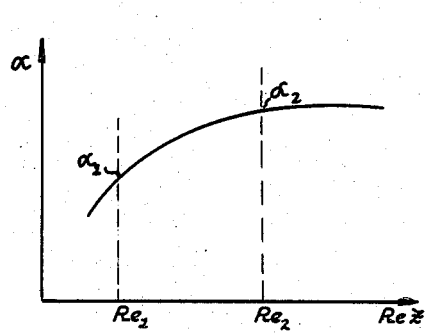
Fig. 1 is a characteristic curve indicating the change of $\alpha$ values in the lower Reynolds number range.

In the known throttle openings, however, the $\alpha$-values as a function of the Reynolds number are not constant. They show, with nozzle-shaped openings, for example, the characteristic curve illustrated in Fig. 1, in which they increase in the lower Reynolds number range indicated by the distance from $Re_1$ to $Re_2$ from the value $\alpha_1$ to the value $\alpha_2$. Consequently, the velocity $v_2$ at the rate of flow $Q_2$ in the upper part of the measuring range represented, is not equal to $v_2$, $(= Q_2/F \cdot \alpha_1)$, as it should be at $\alpha_1 = \alpha_2$, but is equal to $Q_2/F \cdot \alpha_2$, that is smaller than at $Q_1$. Inversely, the velocity of flow $v_1$ at the rate of flow $Q_1$ in the lowermost part of the measuring range represented is not equal to $v_1$, $(= Q_1/F \cdot \alpha_2)$, but equal to $Q_1/F \cdot \alpha_1$, that is, greater than at $Q_2$.

The impulse content of the flow at the rate of flow $Q_1$ is thus relatively greater than at the rate of flow $Q_2$, because $v_1 > v_2$. In general, the relative velocity difference expressed as $$\frac{v - v_1}{v}$$

and hence the relative impulse difference on increase of the rate of flow from $Q_1$ to $Q_2$ becomes always smaller and that in a fashion similar to a hyperbola, in order for $Q_2$ to equal zero.

Since, however, linearity between the velocity of flow $v$ and the rate of flow $Q$, or the circumferential velocity $u$ of the paddle wheel proportional to it, is required for the measurement and since according to the above $u$ is proportional to $v$, a greater impulse excess $$\Delta_I = \frac{(v_2 - v_1)}{v_2}$$

is available for the paddle wheel at small Q than at large Q.

This fact advances to meet the requirements of Woltman meters to a considerable degree. For in these meters, the running resistances of the paddle wheel require at all speeds of rotation approximately the same driving output, a greater impulse fraction relative to the impulse content of the existing flow of measuring medium is hence withdrawn at small Q than at greater Q and greater velocity of flow.

In other words, in the measuring wheel plane of Woltman meters, even in using a throttle opening with an outflow co-efficient $\alpha$ variable at small Reynolds numbers (assuming it to be a nozzle), by suitable choice of the opening proportions $m$, i.e., the aperture ratio $(d/D)^2$ wherein $d$ is the throttle diameter of the outflow edge and D is the diameter of the line at the throttle, and hence of the $\alpha$-characteristic of this nozzle, a rotor wheel speed can be achieved which is proportional to the rate of flow, since the available impulse and the output corresponding to it for all Q-values of the measuring range is equal to the above-mentioned driving output required by the running resistances or corresponds to it with an approximation sufficient for all practical cases.

It is to be noted that on flowing through a nozzle a pressure drop $\Delta p$ with respect to the absolute service pressure $p$ arises and that a volume expansion consequently, in the case of compressible fluids, occurs, which as is known is proportional to $\Delta p/p$, and hence increases with the square of the rate of flow Q. This expansion process may not be neglected, since the velocity of flow $v$ is increased by it in the nozzle and as a result an increase of the circumferential velocity of the rotor wheel and hence a plus-error in the indication of the Woltman meter occur.

Figure 2:
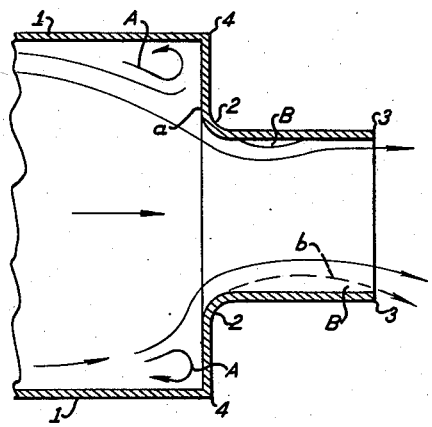
Fig. 2 is a diagrammatic vertical section showing a conventional throttle opening having an elongated nozzle profile.
Figure 3:
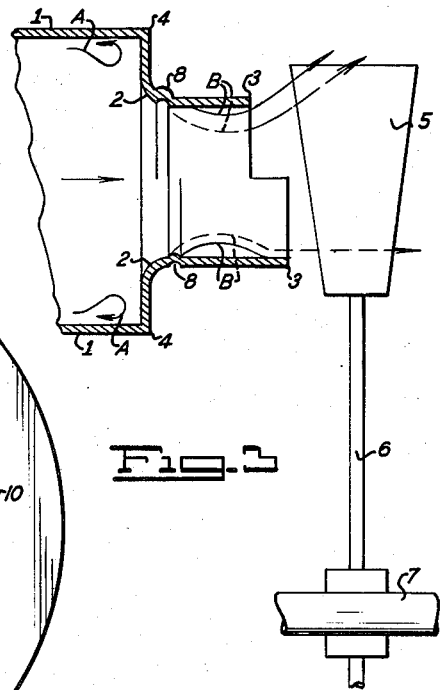
Fig. 3 is a diagrammatic vertical section showing an embodiment of an axial flow meter nozzle in accordance with the invention and showing a portion of the meter wheel.

How this plus-error is also avoided by the present invention is illustrated in Figs. 2 and 3.

A nozzle with a sharp inflow curve 2 is located in a pipe-line 1, which nozzle has a cylindrical extension 3 at its outflow and is traversed by the measuring medium in the direction of the arrows shown. In close proximity to the walls of the pipe-line 1, a considerable delay occurs in the velocity of flow (formation of the so called limiting layer). If the limiting layer energy is small, loosening of the limiting layer results and a corner eddy A is formed.

At greater lengths of the preceding straight pipe-line 1 that is always the case, whereas with a short inflow the velocity is uniformly distributed over the pipeline cross-section and no limiting layer and hence no corner eddy can be set up. In the first case, the velocity in the corner 4 equals zero, in the second, if $\rho$ is the density of the flowing medium and $c$ is its flow velocity in the pipe-line 1, there the total pressure $p + \rho \cdot c^2/2$ is set up. In the first case $\rho \cdot c^2/2$ disappears approximately completely, and the pressure in the corner 4 is equal to the absolute service pressure $p$.

If the corner eddy A is existing, a stoppage point forms at the inflow side of the nozzle, approximately at $a$, beginning from which a laminar limiting layer forms, which loosens at the sharp inflow curve 2 and later becomes wavy and turbulent. In the sub-critical Reynolds number range, in which the dynamic forces are smaller than the viscosity forces, the flow remains unloosed and an eddy B formed by the turbulence extends, as shown in the lower part of Fig. 2, up to the end of the cylindrical extension 3. In the super-critical range, however, the same laminar loosening first occurs. There the flow more rapidly becomes turbulent again, however, and the forces of inertia, as shown in the upper part of Fig. 2, cause it to become flat again and to lie close to the cylindrical extension 3 before the end of the same.

The larger are the forces of inertia, that is, the larger the Reynolds number, so the more rapidly the flow in the cylindrical extension 3 is brought again to lie close to the same. This also explains the known drop of the $\alpha$-value of nozzles with decreasing Reynolds number.

The eddy B is a symmetrical annular eddy in the known nozzle shape shown in Fig. 2, which eddy shifts in the cylindrical extension 3 of the nozzle on alteration of the Reynolds number. If, in accordance with the present invention, however, the cylindrical extension is made longer or shorter on one side of the nozzle than on the other side, as shown generally in Fig. 3, then the jet of measuring medium passes earlier from the nozzle at the shorter side than at the longer side.

The known phenomenon of the lateral jet broadening of a stream leaving a throttle opening hence occurs earlier at the short side than at the long side. An increase in the stream cross-section consequently occurs at the short cylindrical outflow portion, already when the longer portion at the other side still guides the flow. Hereby the centre of mass of the velocity profile becomes moved somewhat away from the side of the longer cylindrical portion and at the same time the velocity of flow of the measuring medium becomes decreased as a result of the increase in the stream cross-section.

At smaller Reynolds numbers, the eddy B extends up to the end of the long part of the cylindrical extension or even beyond and has its greatest thickness at a point $b$, which lies within the short cylindrical portion. From there a widening of the jet occurs both in the short as well as in the long cylinder portions. As soon as the stream leaves the shorter part and the already mentioned lateral jet broadening occurs, there is set up according to the law of action and reaction an impulse rising with rising Reynolds number transverse to the direction of the stream, which impulse tends to produce a shifting of the flow towards the opposing side, that is, towards the side of the longer cylindrical portion.

Figure 4:
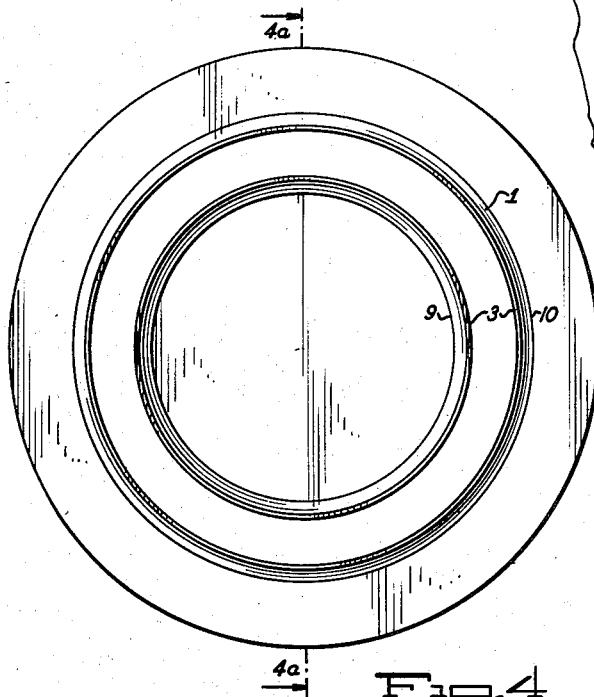
Fig. 4 is a plan view, viewed from the rear, showing an embodiment in accordance with the invention provided with an anular nozzle opening.

The part of the eddy B located at this opposite side with small Reynolds number yields, and that the more so as it is thicker, that is, the smaller is the Reynolds number, so that by the law of action and reaction the centre of mass of the stream shifts to a greater or lesser amount according to the position and size of the eddy B acting as a buffer, that is, according to the size of the Reynolds number, namely, with rising Reynolds number towards the side of the shorter cylinder portion, with decreasing Reynolds number towards the other side. The nozzle of Fig. 3 can also represent cross-sections of a nozzle defined by an annular opening as shown in Fig. 4 or by a ring of individual circular openings as shown in Fig. 5 as in both cases cross-sections would appear identical.

Fig. 3 also represents the vertical section of a preferred construction of the invention in which the nozzle preceding the vane circle 5 of the rotor wheel 6 is an annular nozzle, wherein the short cylindrical portion lies away from the rotor wheel shaft 7 at the greater radius, that is, forming the outer cylinder, whilst the longer cylindrical portion lies at the shorter radius and hence forms the inner cylinder. The extent of the eddy B for small Reynolds numbers is shown in dotted lines, that for large Reynolds numbers is shown in full lines, so that the action of this eddy broadening on the vanes of the succeeding rotor wheel can readily be appreciated:

As a result of the construction of the throttle device according to the invention, the centre of mass of the outflowing stream of measuring medium moves outwards with increasing Reynolds number at the inflow side of the rotor wheel vanes, that is, the radius at which the centre of mass of the stream impinges on the rotor wheel increases, so that with increasing Reynolds number an increasing diminution of the angular velocity of the rotor wheel shaft 7 occurs. This diminution becomes increased further by the broadening of the jet increasing the stream cross-section at the outlet and the decrease of the outflow velocity of the jet connected therewith.

By the action described herein reducing the speed of rotation, the above-mentioned rotation accelerating effect of the volume expansion, when measuring compressible fluids, caused by the pressure drop $\Delta p$ is nearly completely compensated, so that a plus-indication of the meter is avoided.

The carrying out of the invention is not restricted to the embodiment shown in Fig. 3. The same effect as described also occurs if the two nozzle parts have equally long cylindrical extension, but are arranged in staggered relationship with respect to each other in the axial direction as shown in Figs. 4b and 6. A very advantageous construction is given if the two nozzle parts are made relatively adjustable in the axial direction. As shown in Fig. 4b, the nozzle is defined by two cylindrical inserts, each having the portions 1 and 3. The inserts are screwed into a nozzle plate with the radially outer cylindrical insert screwed in place by means of the screw thread 10, and the radially inner insert by the screw thread 9. By turning either or both of these inserts, the same are screwed in or out of the nozzle plate to a greater or lesser extent and thus the degree that the outflow edge of the extension 3 of the radially inner insert extends closer to the plane of rotation of the measuring wheel than the outflow edge of the extension 3 of the radially outer insert may be varied, varying the stepped profile defined by these outflow edges. The possibility of fine adjustment is given in this way. The determination of the difference in length at the cylindrical part or the mutually opposite staggering with cylindrical extensions of equal length may be effected empirically. In the limiting case, the length of the cylindrical outflow extension on one nozzle part would be equal to zero.

For stabilizing the position of the eddy B at the outflow end of the curve 2 or at the start of the cylindrical extension 3, small edges 8 can be provided, which provide for eddy formation, even if undesired contingencies upset the flow as shown in Fig. 3. As shown the upper part or outer ring is formed as a groove and that of the lower part or inner ring is formed as a small shoulder (step, inlaid wire ring or the like).

What I claim is:

1. In an axial flow measuring wheel meter for measuring volumes of compressible fluids, having a rotatably mounted measuring wheel, means defining at least one nozzle positioned in front of said measuring wheel for directing fluid passing therethrough to impinge on said measuring wheel and cause rotation thereof, and means for passing fluid to be measured through said nozzle, the improvement which comprises a cylindrical extension means for said nozzle directed toward said measuring wheel and terminating in an outflow edge means having a stepped profile so that one portion of said outflow edge means is closer to the plane of rotation of said measuring wheel than the remaining portion.

2. Improvement according to claim 1, in which said nozzle is defined by a nozzle plate positioned in front of said measuring wheel.

3. Improvement according to claim 2, in which said nozzle has its axis substantially parallel to the axis of rotation of said measuring wheel.

4. Improvement according to claim 1, in which said portion of said outflow edge means closest to the plane of rotation of said measuring wheel is positioned at a smaller radial distance from the axis of rotation of said measuring wheel than the other portion of said outflow edge means.

5. Improvement according to claim 1, in which the axial length of all the peripheral portions of said nozzle including said cylindrical extension means are equal.

6. Improvement according to claim 1, in which the axial length of the peripheral portion of said nozzle having said outflow edge means closer to the plane of rotation of said measuring wheel, is greater than the axial length of the peripheral portion of said nozzle having the remaining portion of the outflow edge means.

7. Improvement according to claim 1, in which said cylindrical extension means is a bi-part cylindrical extension means with one of said parts having said outflow edge means closer to the plane of rotation of said measuring wheel and including means for adjusting the relative axial position between said cylindrical extension parts to thereby vary said stepped profile.

8. Improvement according to claim 1, including a ring of annularly positioned corresponding individual nozzles, each of said nozzles being positioned in front of said measuring wheel for directing fluid passing therethrough to impinge upon said measuring wheel to cause rotation thereof.

9. Improvement according to claim 8, in which substantially one-half of the outflow edge means of each nozzle is positioned closer to the plane of rotation of said measuring wheel than the remaining half.

10. Improvement according to claim 9, in which the portion of the outflow edge means of each nozzle positioned closer to the plane of rotation of said measuring wheel is also positioned closer to the center of the ring of the said nozzles than the remaining portion of said outflow edge means.

11. Improvement according to claim 10, in which the portion of each of said nozzles having said outflow edge means closer to the plane of rotation of measuring wheel has a projection extending transversely to the axis of said nozzle, positioned adjacent the inflow portion of said cylindrical extension means, and in which the portion of each of said nozzles having the remaining portion of said outflow edge means defines a groove extending transversely to the axis of said nozzle, positioned at the inflow portion of said cylindrical extension means.

12. Improvement according to claim 1, in which said nozzle is an annular nozzle.

13. Improvement according to claim 12, in which the radially inner outflow edge means portion of said annular nozzle is positioned closer to the plane of rotation of said measuring wheel than the radially outer outflow edge means portion of said annular nozzle.

14. Improvement according to claim 13, in which the radially inner portion of said annular nozzle defines an annular projection adjacent to the inflow portion of said cylindrical extension means and in which the radially outer portion of said annular nozzle defines an annular groove adjacent to the inflow portion of said cylindrical extension.

References Cited in the file of this patent

UNITED STATES PATENTS

| 223,402 | Stanton | Jan. 6, 1880 |
| 972,156 | Brown | Oct. 11, 1910 |
| 2,651,370 | Pearson | Sept. 8, 1953 |

FOREIGN PATENTS

| 490,501 | Great Britain | Aug. 16, 1938 |